United States Patent

[11] 3,596,257

[72] Inventor Rajani Manibhai Patel
Arcadia, Calif.
[21] Appl. No. 858,748
[22] Filed Sept. 17, 1969
[45] Patented July 27, 1971
[73] Assignee Burroughs Corporation
Detroit, Mich.

[54] METHOD AND APPARATUS FOR ALLOCATING SMALL MEMORY SPACES TO A COMPUTER PROGRAM
12 Claims, 3 Drawing Figs.

[52] U.S. Cl. 340/172.5
[51] Int. Cl. G06f 9/06
[50] Field of Search 235/157; 340/172.5

[56] References Cited

UNITED STATES PATENTS

| | | | |
|---|---|---|---|
| 3,238,510 | 3/1966 | Ergott, Jr. | 340/172.5 |
| 3,331,056 | 7/1967 | Lethin et al. | 340/172.5 |
| 3,441,908 | 4/1969 | Mizzi | 340/172.5 |

OTHER REFERENCES

Randell, B., " Partial Paging of Segments"; in IBM Technical Disclosure Bulletin, Vol. 10, No. 12, May, 1968; pp. 1839—1841.

*Primary Examiner*—Paul J. Henon
*Assistant Examiner*—Melvin B. Chapriek
*Attorney*—Christie, Parker and Hale

ABSTRACT: An arrangement for allocation of small spaces in an addressable memory for use by a computer program. Blocks of memory are each subdivided into a predetermined number of equal areas. The base address of a block, the size of the subdivided areas in the block, and the availability status of each area in the block are specified in a status word associated with the block. Each block has its own status word stored in memory Whenever a particular size are a is needed in memory, the status words are examined to locate a block having an area of the required size available. If no area of the required size is available, a new block is established and a status word defining the new block is loaded into memory.

INVENTOR.
RAJANI M. PATEL

BY

Christie, Parker & Hale
ATTORNEYS

METHOD AND APPARATUS FOR ALLOCATING SMALL MEMORY SPACES TO A COMPUTER PROGRAM

FIELD OF THE INVENTION

This invention relates to digital computers, and more particularly, it is concerned with a method and apparatus for allocating small memory spaces to a computer program.

BACKGROUND OF THE INVENTION

In present day multiprocessing systems, in order to conserve required addressable memory space, and to adapt the system to automatic programming, it is desirable that memory space be allocated to a program dynamically and that addressing of memory by the program be done indirectly. This permits available memory space to be allocated to a program as needed and then deallocated when the program or segment of the program is completed. Such an arrangement permits much more efficient use of the memory space and permits each program to be compiled independently of absolute memory addresses.

The management of memory is accomplished by routines stored as part of the Master Control Program (MCP). When an object program requires memory space which has not yet been allocated, the object program is interrupted and the MCP enters a routine for allocating the required space. To achieve this dynamic allocation and to protect the already allocated spaces from being invaded, memory space is arranged in two linked chains. All available spaces are linked together in one chain while all spaces in use are linked together in another chain. In terms of address locations the spaces linked by these two chains are scattered throughout memory. To provide the necessary information to link these spaces together, such as the address of the previous space in the chain, the address of the next space in the chain, the size of the space, et cetera, three or four control words must be stored in memory for each memory space in the two chains. This "overhead" required by the MCP to manage the memory becomes particularly wasteful of memory space where a large number of very small spaces are established and wasteful of processing time where such areas are to be managed frequently.

SUMMARY OF THE INVENTION

The present invention is an improvement in the above-described system for managing memory for small size frequently used areas. This is accomplished by providing an arrangement in which one or more spaces (hereafter called blocks) in the linked chain of available spaces are transferred to the in-use chain and subdivided into a predetermined number of "mini" areas, the mini areas in any one block being equal in length, i.e., equal in the number of sequentially addressable locations within each of the mini areas. When an area in memory smaller than some predefined size or length is required by the requesting program, a search is made through a group of area status words (ASW) stored in memory. Each ASW defines the base address of a subdivided block, the size of the mini areas of that block, and the availability or in-use status of each mini area. The bits defining availability status are arranged in sequence within the ASW that corresponds to the sequence of mini areas within the block so as to provide address indexing information of the mini areas from the base address.

By searching the list of area status words, a block may be located having the required size mini areas. The status bits are then examined to determine the address of an available mini area within the block. If no block is found having the required mini area size, or if all the mini areas of the required size are in use, a new status word is added to the list defining a new block subdivided into the required size of mini areas. In either event, an address is made available to the system of an available mini area of the required size. The amount of "overhead" is thereby substantially reduced since a single additional control word, the ASW, is all that is required for allocation of a large number of mini areas in memory.

DESCRIPTION OF THE DRAWINGS

For a more complete understanding of the invention, reference should be made to the accompanying drawings wherein.

DETAILED DESCRIPTION

In the following description it is assumed by way of example only, that a processor, in executing an object program, from time to time requires space in memory, such as space for forming messages, for input/output control, or the like. When such a need arises and the area required is a large block of memory, the processor initiates an Interrupt, causing the Master Control Program (MCP) to execute a routine for assigning the required space to the object program. The size (number of sequentially addressable words) of the required memory space is specified by the requesting object program. The MCP searches for an available block of that size and identifies the base address of the block. The processor then returns to the object program which uses the base address to locate the required memory space. If no available space of the required size is found, the MCP executes a routine which sets up a new block of the required size, establishing the required control words for linking the new block into the chain of in-use spaces in memory. This is a standard technique used in the prior art, such as for example, in the Burroughs B5000 Computer.

Figure 1:
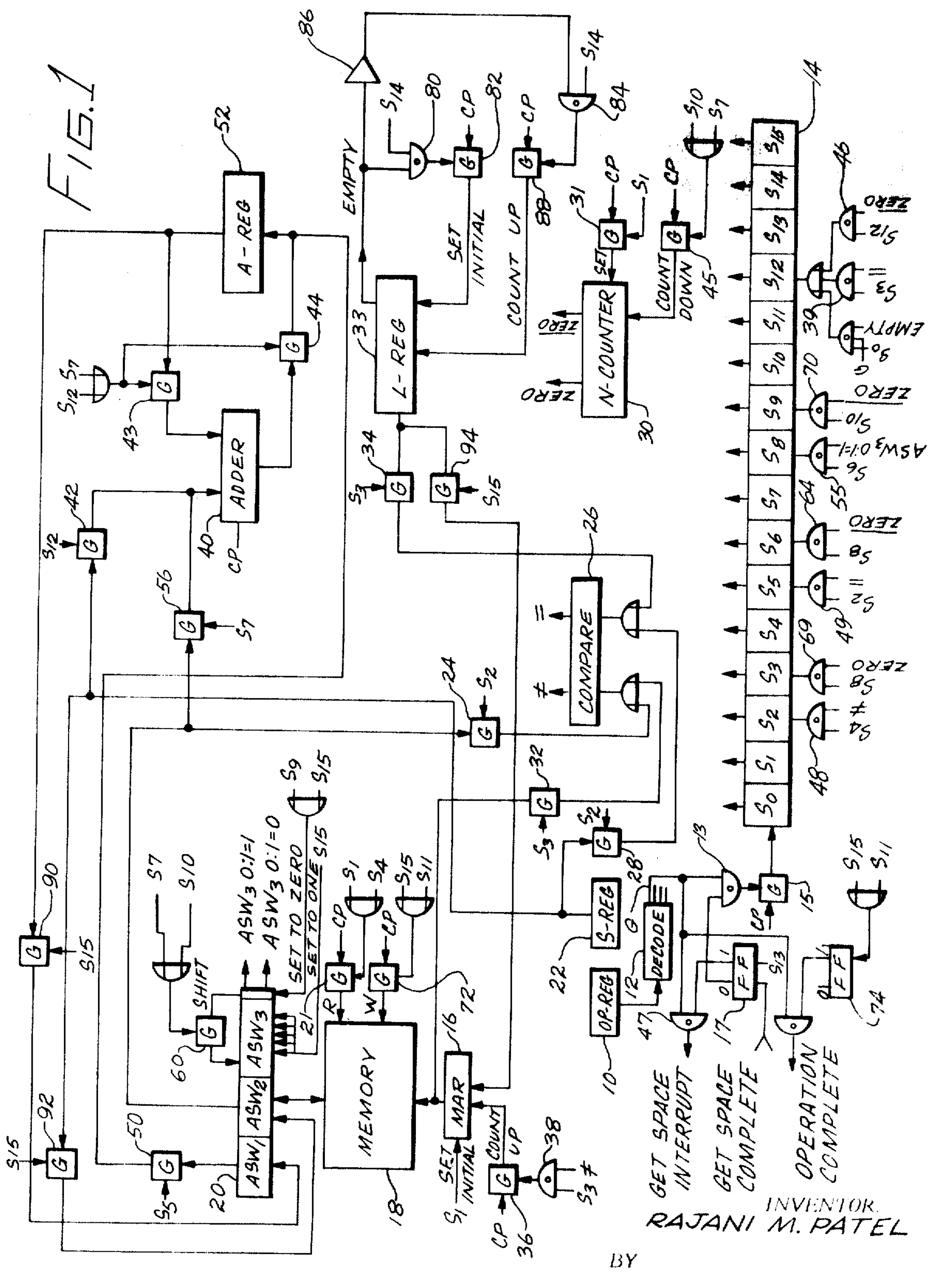
FIG. 1 is a schematic block diagram of one embodiment of the present invention.

According to the teaching of the present invention, if the size of space requested is not greater than some predetermined amount, for example 10 words of memory, then a routine, hereinafter called the "GET" operation, is executed. Referring to FIG. 1, there is shown apparatus for performing this Get operation. In executing a stored program the operators, as they are fetched from memory during execution of the program, are placed in an OP register 10. There each operator is decoded by a decoding circuit 12 which, in response to each different operator, provides an output level on a corresponding one of a plurality of outputs. The particular operator is then executed by control logic in the processor. Assuming the operator is a Get operator, the decoder 12 provides an output level on a line G. Execution of the particular operator is under the control of a sequence counter indicated generally at 14. The sequence counter has a plurality of stable states designated $S_0$ through $S_{15}$. The counter normally advances through these states in synchronism with a string of clock pulses, designated CP, applied to the counter 14 through a gate 15. However, the sequence counter 14 can be set to any one of the stable states in synchronism with a clock pulse by the presence of an input level applied to the corresponding stage of the counter. The use of sequence counters to control the execution of instructions in computers is well known. See, for example, Pat. No. 3,001,708.

Initially the sequence counter idles in the $S_0$ state. When the decoder 12 sets the level on the output G, this level is applied to a logical AND circuit 13 together with the binary 0 output of a control flip-flop, indicated at 17. This flip-flop is initially set to 0. The first clock pulse then advances the sequence counter 14 from $S_0$ to $S_1$. The operation of the Get operator is summarized by the flow diagram of FIG. 2.

During the $S_1$ state an N-counter 30 is set to the number of mini areas, e.g., 20 by the output of gate 31 to which a CP and the $S_1$ state are applied. Also, a memory address register MAR indicated at 16, is set to the initial or base address of a list of area status words ASW stored in an addressable memory indicated at 18. After the MAR register 16 is set to 0 by the $S_1$ level from the sequence counter 14, a memory READ cycle is initiated by which the first word in the list of area status words is transferred to a memory information register 20. To this end, a CP is applied to the READ input of the memory 18 through a gate 21 to which the $S_1$ level is also applied.

The area status word is divided into three portions, $ASW_1$, $ASW_2$, and $ASW_3$. $ASW_1$ specifies the base address of a block of word locations in the memory. $ASW_2$ designates the size of mini areas into which this block is subdivided. $ASW_3$ is a group of bits corresponding in number to the number of mini areas within the block, each bit designating whether the corresponding mini area in the block is available or in use, designated respectively by a binary 1 and a binary 0. For the present description, the number of mini areas into which a block is subdivided, regardless of the size of the mini area, is assumed to be 20. However, the number of mini areas may be any selected number, and may be varied by a program parameter if desired. It will be understood that a fixed number of 20 mini areas has been selected by way of example only in describing the embodiment of the invention set forth in FIG. 1. The manner in which the various status words are assembled in the list in memory will hereinafter be described in detail. For the present, it is assumed that such a list exists and that, in response to the Get operator, these status words are read out in sequence from the memory 18 for the purpose of locating a block within memory having an available mini area of the required size.

To this end, after the first area status word in the list has been read into the register 20 and the sequence counter 14 has advanced to the $S_2$ state by the next CP, a comparison is made between the mini area size designated by the portion $ASW_2$ of the area status word in the register 20, and the size of memory requested by the object program as previously stored by the program in an S-register, indicated at 22. A gate 24 to which the $S_2$ state is applied gates $ASW_2$ to one input of a Compare circuit 26. A gate 28 similarly gates the contents of the S-register 22 to the other input of the Compare circuit 26. The Compare circuit 26 provides an output level on one of two outputs, designated = and ≠, depending on the condition of the two inputs to the Compare circuit 26.

If the comparison is not equal (≠), the sequence counter 14 advances to the $S_3$ state and a further comparison is made between the address and the MAR register 16 and the contents of an L-register 33. This register normally contains the address of the last area status word to be placed in the list in the memory 18. To make the comparison, the contents of the MAR register 16 are coupled through a gate 32 to which the $S_3$ state is applied to one input of the Compare circuit 26. Similarly a gate 34 to which the $S_3$ state is applied couples the contents of the L-register 33 to the other input of the Compare circuit 26. If they are not equal, indicating that the address in the MAR register 16 is less than the last address of the list of area status words, the MAR register 16 is counted up one by the next clock pulse. This clock pulse is applied to the MAR register 16 through a gate 36, which responds to the output of an AND circuit 38 to which the $S_3$ state of the sequence counter 14 and the ≠ output of the Compare circuit 26 are applied.

If the comparison indicates that the MAR register 16 corresponds to the last address of the list, this means that no area of the required size was available and that a new block of memory must be allocated. As shown by the flow diagram of FIG. 2, this requires that the size area be multiplied by the number of areas in a block, e.g., 20, and the result be loaded in a register to indicate the amount of memory space needed for a new block. At the same time the control flip-flop 17 is set to 1 to interrupt the sequence counter and to initiate a Get Space Interrupt condition.

This is accomplished by the output of an AND circuit 39 to which the $S_3$ state and the = output of the Compare circuit 26 are applied. The AND circuit 39 sets the sequence counter 14 to $S_{12}$ with the next CP. During the $S_{12}$ state, the contents of the S-register 22 are coupled to an Adder 40 through a gate 42. Also the contents of an A-register 52, which initially is zero, are coupled to the adder by a gate 43. The output of the Adder 40 is coupled back to the A-register 52 by a gate 44. The sequence counter remains in the $S_{12}$ until the N-counter 30 is counted down to zero by CP's applied to the counter by a gate 45. An AND circuit 46 senses the $S_{12}$ state and the zero (not zero) state of the N-counter 30 and sets the sequence counter to $S_{12}$. When the N-counter 30 is counted down to zero, the size data has been added to itself 20 times and the result stored in the A-register 52. During $S_{13}$, the flip-flop 17 is set to 1, stopping the advance of the sequence counter by CP's. An AND circuit 47 senses G and that flip-flop 17 is 1, producing an output signal to the system calling for a Get Space Interrupt operation. As hereinafter described, this Interrupt gets an additional block of memory.

Assuming that the contents of the MAR register 16 were not equal to the last address stored in the L-register 33, the sequence counter advances to the $S_4$ state during which a READ cycle in the memory 18 is initiated. To this end the $S_4$ state is applied to the gate 21 to initiate the READ cycle, placing the next area status word of the list in memory into the register 20. At the same time, the sequence counter 14 is returned to the $S_2$ state by the output of an AND circuit 48, to which the $S_4$ state of the sequence counter 14 and the ≠ state of the Compare circuit 26 are applied. Thus another comparison on the next status word is made and, as shown by the flow diagram FIG. 2, this process continues until either an area status word having the requested size of mini areas is found, or the list is exhausted and a Get Space Interrupt is produced.

Assuming that an area status word is found with the correct size, the sequence counter 14 advances from the $S_4$ state to the $S_5$ state. Note that if the correct size mini area is defined by the first area status word, the sequence counter 14 advances directly from $S_2$ to $S_5$ by the output of an AND circuit 49 to which the $S_2$ state and the = state of the Compare circuit 26 are applied. During the $S_5$ state of the sequence counter 14, the base address in the $ASW_1$ portion of the register 20 is transferred by a gate 50 to the A-register 52. The sequence counter 14 then advances to the $S_6$ state.

Figures 2, 3:
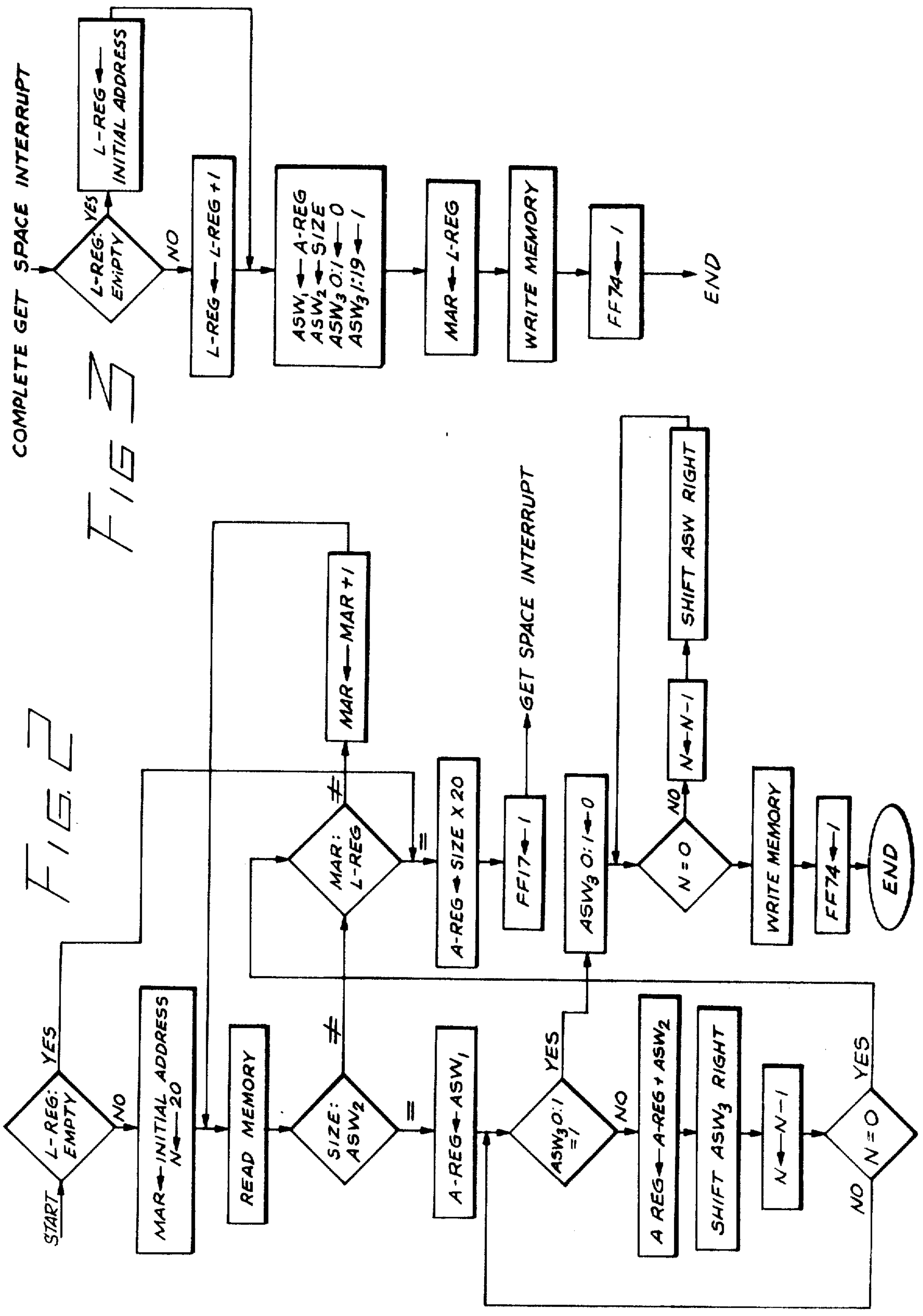
FIGS. 2 and 3 are flow diagrams useful in understanding the operation of the invention.

As shown by the flow diagram of FIG. 2, at this point a determination is made on the lowest order bit of the status bits in the $ASW_3$ portion of the register 20. If the bit is a 1, the first mini area is available. In this case the sequence counter is set to $S_9$ state by the output of an AND circuit 55 which senses that $ASW_3 0{:}1=1$ and that the sequence counter is in the $S_6$ state. Note that fields of digits in a register are specified by the conventional notation *a:b* where *a* identifies the most significant bit position and *b* specifies the number of bits in the field. Thus $ASW_3 0{:}1=1$ indicates that the contents of $ASW_3$ starting at position 0 as the most significant bit and having a field length of 1 bit is equal to 1. An arrow (←) in place of the equal sign (=) indicates that the designated field in the register is to be set to the binary equivalent of the number to the right of the arrow. If the bit is a 0, the first mini area is in use. If the bit is a binary 0, the sequence counter 14 advances to the $S_7$ state. During the $S_7$ state, the address in the A-register 52 is incremented in the amount of the mini area size specified in the $ASW_2$ portion of the register 20. This provides the address of the second mini area in the block of correct size mini areas. To this end the Adder 40 is used to which the contents of the A-register 52 is connected by the gate 43 and the $ASW_2$ portion is connected by a gate 56. The output of the Adder 40 is coupled through the gate 44 back to the A-register 52, the gate 44 responding to the $S_7$ state of the sequence counter 14. At the same time the $ASW_3$ portion of the register 20 is shifted so that the second lowest order bit is shifted to the right-hand most position of the register 20. At the same time, the lowest order bit is shifted to the highest order position of the $ASW_3$ portion of the register 20 through a gate 60 to which the $S_7$ state is applied. Also, the N-counter 30 is counted down one by the next clock pulse applied through the gate 45 to which the $S_7$ state is also applied. The sequence counter 14 then advances to the $S_8$ state.

At this time the N-counter 30 is examined to determine whether it has been counted down to zero. If it is not zero ($\overline{ZERO}$), the sequence counter 14 is reset to the $S_8$ state by the output of an AND circuit 64 to which the $S_8$ state is applied together with the $\overline{ZERO}$ state of the N-counter 30. If the N-counter 30 is zero, as shown by the flow diagram of FIG. 2, the operation continues by continuing the search through the list of stored area status words. To this end, an AND circuit 69 senses that the N-counter is in the ZERO state and the sequence counter is in $S_8$ state. The output of the AND circuit 69 returns the sequence counter 14 to the $S_3$ state.

As shown by the flow diagram of FIG. 2, the above-described process continues until a status bit is found which indicates that the corresponding area is available, i.e., the status bit is set to binary 1. At the same time, the address in the A-register 52 is incremented so as to be pointing successively to the address of the higher orders of mini area within the block. When the status bit indicates that the associated mini area is available, the sequence counter 14 advances to the $S_9$ state by the output of the AND circuit 55.

During the $S_9$ state, the status bit is set from 1 to 0. This indicates that the associated mini area within the block is no longer available but is in use. It is now necessary to shift the status bits in the $ASW_3$ portion back to their original position. This is accomplished during the $S_{10}$ state to which the sequence counter 14 advances automatically from the $S_9$ state. The sequence counter 14 is then held in the $S_{10}$ state during successive clock pulses by the output of an AND circuit 70 to which is applied the $\overline{ZERO}$ state of the N-counter 30 and the $S_{10}$ state. Thus the sequence counter remains in the $S_{10}$ state for a series of clock pulses until such time as the N-counter 30 is counted down to zero. This is accomplished by applying the $S_{10}$ state to the gate 45 to permit clock pulses to count down the N-counter 30. When the N-counter 30 reaches the ZERO state, the sequence counter advances to the $S_{11}$ state. However, during the $S_{10}$ state, the gate 60 produces an end-around shift of $ASW_3$ with each clock pulse. When the N-counter 30 is counted to zero and the sequence counter advances to $S_{11}$, the $ASW_3$ has been shifted to bring the lowest order bit back to the lowest order position in the $ASW_3$ portion of the register 20.

With the sequence counter 14 advanced to the $S_{11}$ state, the contents of the register 20 are restored to the memory 18 by a WRITE cycle. To this end, the $S_{11}$ state is applied to a gate 72 for gating a clock pulse to the WRITE input to the memory 18. At the same time a control flip-flop 74 is turned on by the $S_{11}$ state to provide an Operation Complete output signal designated OC. The control flip-flop in the binary 1 state, together with the G line output of the decoder 12, indicate that the Get operation has been completed and that an address is available in the A-register 52 pointing to an available area in the memory of the required size. This permits the operation of the processor to return to the object program to fetch the next instruction and to utilize the address of the A-register 52 to identify the needed memory space.

Once the last area status word in the list in memory is tested and no area of the required size has been found or no area of the required size is available for use, a new block of memory space must be allocated and a new area status word established in the list. A new space in memory is obtained by producing an Interrupt condition, called a Get Space Interrupt. Like any Interrupt operation, contents of the various registers are cleared and stored in memory in the manner described in U.S. Pat. No. 3,286,236. The operation of the processor then switches to the Master Control Program for execution of the Get Space Interrupt routine by which the Master Control Program allocates spaces in memory. Such a routine is well known. For example, a Get Space procedure is provided as part of the Master Control Program of the Burroughs B-5500 computer system and is described in the publication "A Narrative Description of the Burroughs B-5500 Disk File Master Control Program" published by Burroughs Corporation, Oct. 1966. The Get Space routine utilizes the size information in the A-register 52. Briefly, the Get Space routine searches through the linked chain of available storage and on finding a section of available space large enough to fulfill the request, reserves the required space. To reserve the space, it is removed from the linked list of available storage and transferred to the linked list of "in-use" storage. If not all of the memory space located is needed for the request, the part remaining is linked in with the list of available storage. The base address of the requested space is placed in the A-register 52 and the Interrupt condition is exited by an Interrupt Complete signal. With the completion of the Interrupt, the registers are reloaded from memory and the execution of the Get operator continues.

After completion of the Get Space Interrupt, to complete execution of the Get operator, it is necessary to place a new area status word in the list in memory identifying the new required space in memory. This is shown by the flow diagram of FIG. 3. The sequence counter 14 advances from the $S_{13}$ state, which it was in when the Interrupt occurred, to the $S_{14}$ state. As shown by the flow diagram of FIG. 3, if the L-register 33 is empty, signaling an Empty condition on an output line, the L-register is set to the initial address of the area status word list. This is accomplished by an AND circuit 80 to which the $S_{14}$ state is applied together with the line from the L-register 33 identifying it as empty. The output of the AND circuit 80 is applied to a gate 82 for gating the next clock pulse to the L-register to set it to the initial address. If, on the other hand, the L-register 33 is not empty, it is counted up one. To this end, an AND circuit 84 senses the $S_{14}$ state and the Empty line from the L-register 33 through an inverter 86. Thus, when the L-register 33 is not empty, the output of the AND circuit 84 opens a gate 88 for gating the next clock pulse to the L-register to count it up one. The sequence counter 14 then advances to the $S_{15}$ state.

During the $S_{15}$ state, the contents of the A-register 52, which is the base address of the block of space set aside by the Get Space Interrupt routine, is transferred by a gate 90 to the $ASW_1$ portion of the register 20. Also, the area size information in the S-register 22 is transferred by a gate 92 to the $ASW_2$ portion of the register 20. The lowest order bit of the $ASW_3$ is set to zero indicating that it is now in use, while the remaining bits in $ASW_3$ are set to 1 indicating that these areas are available and not in use. The contents of the L-register 33 are transferred to the MAR register 16 by a gate 94. The clock pulse at the end of the $S_{15}$ state then causes a memory WRITE operation by coupling the $S_{15}$ state through the gate 72 to the WRITE input of the memory 18. Also, the control flip-flop 74 is turned on indicating that the Get operation is complete and signaling an OC condition to the processor. This would normally result in a fetching of the next operator in the program and the resetting of the sequence counter 14.

From the above description it will be recognized that the present invention provides an arrangement by which memory spaces can be subdivided into small areas with substantially less overhead per area. The only overhead required is a single area status word for 20 areas of memory, rather than the three or four control words normally associated with a linked memory space.

What I claim is:

1. The method of allocating small areas of memory to a program where the size of the required area is specified by the program, comprising the steps of: storing a list of area status words in memory, each status word identifying the base address of a block of memory space that is divided into a predetermined number of equal size areas, the size of said equal size areas within the block, and the availability status of each area within the block; reading out the status words in predetermined sequence from the memory; comparing the specified area size required by the program with the area size identified by each status word as it is read out of memory to locate a particular status word identifying a block having the required size of said equal size areas; scanning the availability status of each area within the particular status word when located to find an area that is available; incrementing the base address by the size of said equal size areas in the block with the scanning of the availability status of each area; and storing the incremented address when the availability status indicates an area within a block is available.

2. The method of claim 1 further including the steps of: sensing when the availability status of all areas in the block specified by a particular status word has been scanned; and continuing to read out additional status words from memory when the availability status of a status word indicates no area within the located block is available.

3. The method of claim 2 further including the steps of: sensing when the last status word has been read out of memory; and signaling an Interrupt condition after the last status word has been sensed.

4. In a digital computer system, apparatus for allocating memory space, said apparatus comprising: an addressable memory having a plurality of memory status words stored therein, each status word having a first group of bits defining the base address of a block of sequential address positions in the memory, a second group of bits defining a particular size of a number of equal size memory spaces in the associated block, and a third group of bits defining the availability status of each memory space within the associated block; means for reading out the status words from the memory in predetermined sequence; a first register for storing in coded form the size of the memory space to be allocated; means for comparing the second group of bits of each status word read out of memory with the contents of said first register; means responsive to the comparing means for indicating a status word in which the second group of bits is equal to the contents of said first register; means responsive to the indicating means for sensing the availability status bits of said indicated status word; means responsive to said sensing means for indicating the status bit position in the status word of an available memory space within the associated block of memory; and means controlled by said status bit position indicating means for generating the address of said available memory space.

5. Apparatus as defined in claim 4 wherein said last-named means includes means responsive to said position indicating means for incrementing the base address specified by the first group of bits in the indicated status word by the area size specified by the second group of bits in the indicated status word a number of times determined by the position of said available memory space.

6. Apparatus as defined in claim 4 further including means for storing the address of the last status word in memory, means responsive to the last address storing means for sensing when the last status word is read out from memory, and means responsive to said sensing last-named means and to said comparing means for signaling to the computer system that the last status word was read out and the second group bits defining the area size was not equal to the contents of the first register.

7. Apparatus as defined in claim 4 further including means responsive to the status bit sensing means for indicating when no status bits identify an available area, and means responsive to said last-named indicating means for activating said status word read out means to read out the next status word.

8. An internally programmed computer comprising an addressable memory, the memory having a group of memory area status words stored in a predetermined address sequence in the memory, each status word including a first group of bits specifying the base address of a block of words in memory which is subdivided into a number of equal size areas, a second group of bit specifying the size of said equal size areas in the block, and a group of bits identifying the availability status of each of said areas in the block, there being one bit for each area in the block; means for reading out each of said status words in sequence from the memory; first register means for storing in coded form a number identifying a particular size of memory space; comparing means; means for applying the second group of bits of each status word as it is read out of memory and the number in said first register means to the comparing means to locate a status word in which the second group of bits is equal to the number in said register means; means responsive to said comparing means for sensing said availability status bits when the comparing means indicates the second group of bits is equal to the number in the first register means; means responsive to said sensing means for indicating the bit position of a bit identifying an available area; second register means for storing an address; and means responsive to said indicating means for incrementing the first group of bits specifying the base address of the associated status word by an amount corresponding to the number specified by the second group of bits multiplied by the bit position identified by said indicating means, said incrementing means including means for storing the result in the second register means at the incremented address location.

9. Apparatus as defined in claim 8 further including means responsive to said bit position indicating means for changing the status bit at the indicated per bit position to indicate that the corresponding area is no longer available.

10. Apparatus as defined in claim 8 wherein said status bit sensing means includes means sensing said availability status bits in sequence for an area available bit; and said status bit position indicating means includes counting means and means for advancing the counting means in synchronism with the sequence sensing means, whereby the counting means identifies the status bit position of an area available bit.

11. The method of allocating a small area in an addressable memory to a program where the program specifies the size of the small area needed, comprising the steps of: arranging the memory into blocks of contiguous addressable locations and of varying sizes; providing a group of status words, each status word storing a base address of one of said blocks of address locations in memory; dividing each block into a predetermined number of equal areas; storing a number in each status word designating the size of the areas in the block addressed by that status word; and providing at least one bit in each status word for each area in the addressed block to indicate whether or not the area is being used by the program to store useful information.

12. The method of claim 11 further including the steps of: comparing the number in each status word designating the area size with the area size specified by the program to select a status word designating a block of the desired area size; and generating from the base address of the selected status word, the area size, and the bits indicating if the areas are in use or not in use an address within the block of an area not in use.